March 2, 1937.  F. V. COOKE  2,072,156
SPRING SUSPENSION
Filed April 27, 1936
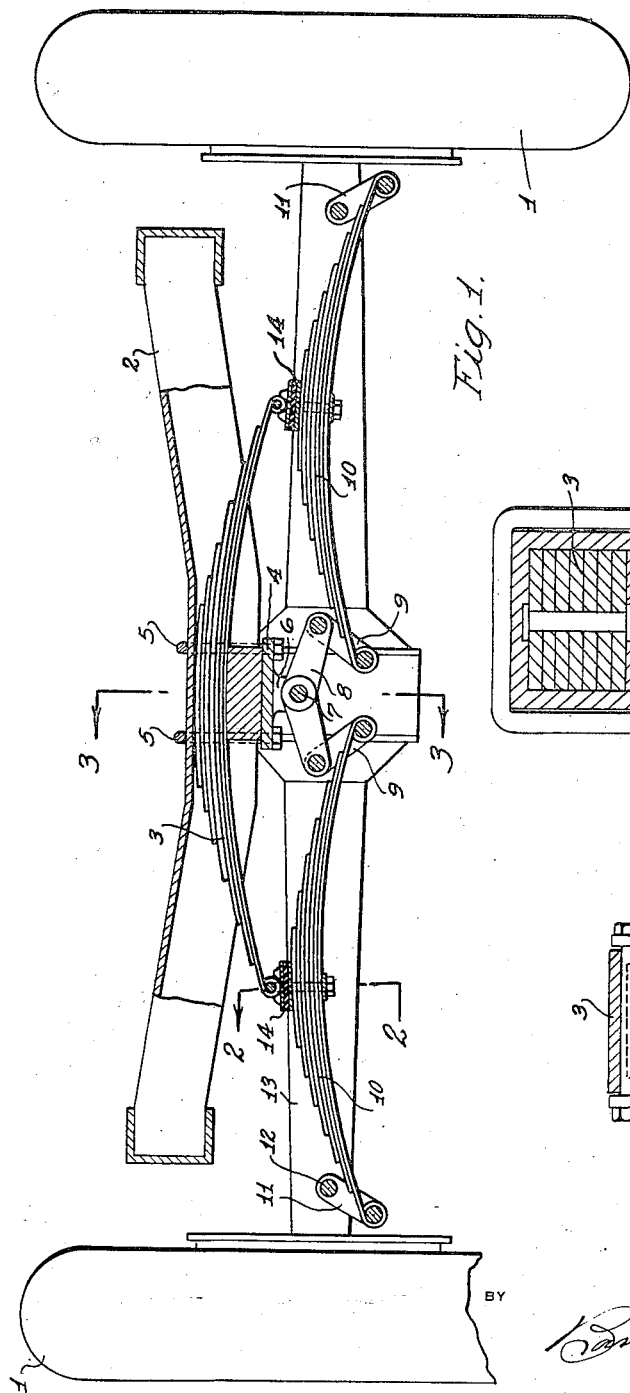
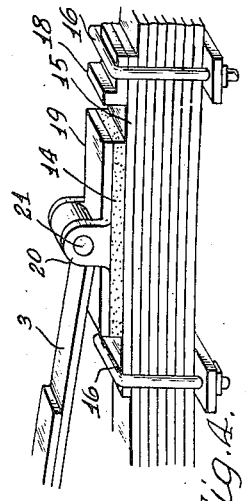
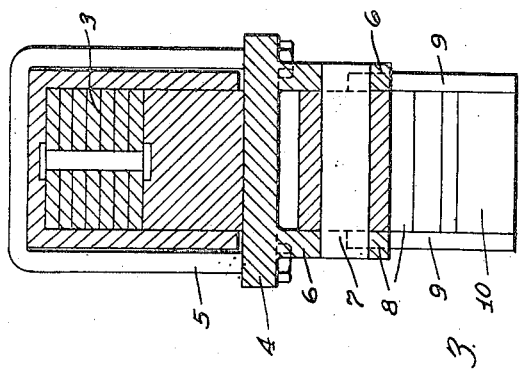
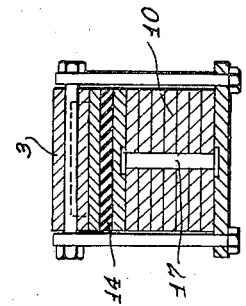
INVENTOR
Frank V. Cooke
BY
ATTORNEYS Patented Mar. 2, 1937

2,072,156

UNITED STATES PATENT OFFICE 2,072,156

SPRING SUSPENSION

Frank V. Cooke, Detroit, Mich., assignor to The Translever Spring Corporation, Detroit, Mich., a corporation of Michigan Application April 27, 1936, Serial No. 76,553

8 Claims. (Cl. 267—36)

This invention relates to vehicular suspension means of particular adaptability to automobiles and has for its object to provide a suspension for an automobile body which will give greater riding comfort, greater safety, and a new freedom from side sway and rebound without the use of shock absorbers.

A further object is to provide a spring suspension composed of a plurality of sets of springs with the points of suspension so arranged that the wheel impacts at one side of the vehicle are transmitted to the springs at the opposite side thereof automatically, thereby bringing all springs into play regardless of the point of load application or direction of road shock.

A further object is to provide a spring suspension composed of a plurality of vertically overlapping springs whereby all available spring areas are very materially increased and whereby oscillations through the springs are automatically balanced and constantly synchronized to be transmitted through a plurality of contact points, ironing out periodic centralization and accumulation of pent up elastic energy. This principle gives a much desired variable to meet every road condition.

More particularly it is an object to provide a single transverse spring for attachment beneath a vehicle body and to support each end of the spring by further transverse springs therebeneath connected together to impart an equalizing action by a central balancing yoke connected thereto, whereby loading and impact variables are transferred to all springs at all times simultaneously with transfer to all single springs by the balancing yoke. At this point suspension by the central balancing leverage yoke becomes obvious. This produces equalized wheel load at all times—better traction—less relative frame stresses.

Other objects will become hereinafter more fully apparent as reference is had to the accompanying drawing wherein my invention is illustrated and in which—

Figure 1 is a rear view of my improved spring suspension mounted on a vehicle, and Figs. 2 and 3 are vertical sections taken along the lines 2—2 and 3—3 respectively of Fig. 1.

Figure 4 is a perspective view of a modified form of the connection between the upper and lower springs.

1 indicates the wheels of a vehicle with a body or body frame 2 for support thereabove. Fixedly secured beneath the frame 2 is a single transverse leaf spring 3. The means for securing the spring 3 in place is a cross member attached to the frame and a saddle 4 through which U-bolts 5 extend upwardly on each side of the spring 3 and through the frame 2. From the bottom of the saddle 4 projections 6 support a pin 7 on which is journalled a vertically movable lever arm 8 at each end of which a shackle 9 is pivotally mounted for freedom angularly.

Each end of the spring 3 connects pivotally with a spring 10, each of these springs 10 being pivotally connected at its inner end to the shackle 9, and central balancing yoke or lever 8, and to a further shackle 11 at its wheel end. Each shackle 11 is supported pivotally at 12 fixed to the axle housing 13.

The connection of the ends of the spring 3 to the lower springs 10 may be by any suitable method but is preferably through a pad of rubber or equivalent material 14. The rubber 14 is preferably surface bonded on its lower side to a plate 15 extending outwardly therebeyond at each end for engagement by the U-bolts 16 which, in conjunction with a center pin 17 hold the spring leaves in assembly. If desired a stop 18 may also be used to limit the possible deflection of the rubber. A top plate 19 is surface bonded to the upper surface of the rubber 14. This plate has ears 20 for supporting a pin 21 and the pin 21 serves as a means for connecting the plate 19 to the upper spring 3. With this arrangement there may be a slight motion of the ends of the spring 3 with respect to the top of the springs 10 without static friction.

During operation if one wheel encounters a road shock and is elevated, the action will be to elevate the outer end of a spring 10 to depress the inner end of this spring, thus rotating the lever arm 8 to raise the inner end of the opposite spring 10 attached to the opposite side of the lever arm or yoke. The centers of both springs 10 will therefore elevate against the ends of the spring 3.

What I claim is:—

1. In a spring suspension for vehicles, a single leaf spring assembly adapted to be secured at its midportion to the bottom of a vehicle body, and two leaf spring assemblies between said single assembly and the wheels of the vehicle, each end of said single assembly being secured to the midportion of one of said two assemblies, the outer end of each of said two assemblies being anchored to the axle housing associated with said wheels, the other end of each of said two assemblies being anchored to a common hanger, said hanger being pivotally connected to said body.

2. In a spring suspension, spring means for rigid anchorage beneath one end of a vehicle body, and two spring means between the first named spring means and an axle housing beneath the same end of said body, each end of said first spring means being anchored to the midportion of one of said two springs, said two spring means extending in tandem transversely of said body, and an equalizing means for adjacent ends of said two springs comprising a hanger bar pivotally mounted on said body intermediate its length with means at each of its ends for pivotal connection to each of said two springs.

3. In a spring suspension, a single leaf spring assembly adapted to be fixedly anchored to the bottom of a vehicle body near one end of the body and transversely thereof, two leaf spring assemblies between said single assembly and the wheels at that end of the vehicle also transversely of said body, each end of said single assembly being directly supported by one of said two springs, said two springs each being of less length than half the distance between said wheels, and an equalizing means to which adjacent ends of said two springs are anchored comprising a rigid hanger bar pivotally connected to said body.

4. In a spring suspension for vehicles, a pair of springs each adapted for attachment at their outer end to the same axle assembly of the vehicle, said springs being arranged transversely of said vehicle, an equalizer bar pivotally secured at its midportion to the underneath side of the body of said vehicle and pivotally attached at its ends to each of said springs, and means extending from the mid portion of each of said springs to said body for the joint support thereof by said springs.

5. In a spring suspension for vehicles, a pair of springs each attached at their outer end to an axle assembly of the vehicle, said springs being arranged in tandem transversely of said vehicle, an equalizer bar pivotally secured at its midportion to the underneath side of said body and pivotally attached at its ends to each of said springs, and a common means for connecting the body of the vehicle to both of said springs whereby said body is jointly supported thereby.

6. In a spring suspension for vehicles, a pair of springs arranged in tandem transversely of the vehicle, one end of each of said springs being connected to the axle assembly of the vehicle, a common spring hanger connected to the body of the vehicle for attachment to the other end of each of said springs, a third spring having its ends supported by said pair of springs at their midportions, and an elastic connection between the ends of said third spring and said pair of springs.

7. In a spring suspension for one end of a vehicle, a pair of springs arranged in parallel, and means secured to the transverse mid portion of the bottom of the vehicle body and adapted to transmit the loading of said body jointly to said pair of springs, and an equalizing bar between the adjacent ends of said pair of springs for transmitting loading directly from one member of said pair to the other thereof.

8. In a spring suspension for vehicles, a single spring secured at its midsection beneath a vehicle body with each end extending toward wheels at opposite sides of said body, rocking means secured to said body at said midsection, said rocking means comprising a substantially straight equalizer bar pivotally attached to said body at its midportion with its axis normally horizontal, shackles pivotally connected at each end of said bar and depending therefrom and two springs between said single spring and the wheels of the vehicle, said two springs each having one end extending from a point adjacent said opposite wheels and pivotally connected to the lower ends of said shackles, each of said two springs directly supporting the ends of said single spring.

FRANK V. COOKE.